United States Patent
Shoobridge (10) Patent No.: US 7,155,262 B2
(45) Date of Patent: *Dec. 26, 2006

(54) WIRELESS ACCESS POINT SOFTWARE SYSTEM

(75) Inventor: Richard Allen Shoobridge, The Woodlands, TX (US)

(73) Assignee: Symbol Technologies, Inc., Holtsville, NY (US)

(*) Notice: Subject to any disclaimer, the term of this patent is extended or adjusted under 35 U.S.C. 154(b) by 566 days.

This patent is subject to a terminal disclaimer.

(21) Appl. No.: 10/629,422

(22) Filed: Jul. 29, 2003

(65) Prior Publication Data

US 2004/0023679 A1 Feb. 5, 2004

Related U.S. Application Data

(63) Continuation of application No. 09/727,860, filed on Dec. 4, 2000, now Pat. No. 6,633,769.

(60) Provisional application No. 60/220,260, filed on Jul. 24, 2000.

(51) Int. Cl.
*H04B 1/38* (2006.01)
(52) U.S. Cl. ............... 455/574; 455/127.1; 455/127.5; 455/343.1
(58) Field of Classification Search ............ 455/127.1, 455/575.1, 127, 574, 127.4, 127.5, 343.1, 455/343.2, 343.5, 343.6; 370/311
See application file for complete search history.

(56) References Cited

U.S. PATENT DOCUMENTS 5,835,366 A * 11/1998 Pleso et al. ............. 363/59
6,212,398 B1 * 4/2001 Roberts et al. ........... 455/502
6,356,538 B1 * 3/2002 Li ........................... 370/311
6,591,368 B1 * 7/2003 Ryu ........................ 713/323
6,633,769 B1 * 10/2003 Shoobridge ............. 455/574
2001/0012794 A1 * 8/2001 Nishihara et al. ........ 455/574
2001/0031626 A1 * 10/2001 Lindskog et al. ......... 455/67.3

* cited by examiner

Primary Examiner—Matthew Anderson
Assistant Examiner—Tan Trinh
(74) Attorney, Agent, or Firm—Amin, Turocy & Calvin, LLP (57) ABSTRACT

A system and method is provided that provides a mobile communication device with the ability to quickly reestablish a communication session with another after the communication device is awaken from a sleep or idle mode. The mobile communication device is provided with a first power system for powering a central operating system and a second power system for powering a communication system. A mobile communication device establishes a communication session with another communication device by establishing a connection and establishing a communication session. During an idle period, the communication session in a stack will be stored in memory. The first power system and the central operating system will then enter a low power or sleep mode, while second power system and the communication system can maintain a communication connection with the other device. Upon reestablishing communications, the mobile communication device will wake up the first power supply and the central operating system. The central operating system will then copy the previous communication session from the memory into the stack and reestablish the communication session with the other device.

28 Claims, 7 Drawing Sheets

WIRELESS ACCESS POINT SOFTWARE SYSTEM

CROSS REFERENCE TO RELATED APPLICATION

This application is a continuation of U.S. Ser. No. 09/727,860 filed on Dec. 4, 2000, now U.S. Pat. No. 6,633,769 entitled "WIRELESS ACCESS POINT SOFTWARE SYSTEM," which claims the benefit of U.S. Provisional Application Ser. No. 60/220,260, filed Jul. 24, 2000, entitled "WIRELESS ACCESS POINT SOFTWARE SYSTEM." The entireties of these applications are incorporated herein by reference.

TECHNICAL FIELD

The present invention generally relates to communication systems, and in particular to a system and method for saving power in a mobile communication device.

BACKGROUND OF THE INVENTION

The use of cellular communication systems having mobile devices which communicate with a hardwired network, such as a local area network (LAN) or a wide area network (WAN), has become widespread. Retail stores and warehouse, for example, may user cellular communications systems with mobile data terminals to track inventory and replenish stock. The transportation industry may use such systems at large outdoor storage facilities to keep an accurate account of incoming and outgoing shipments. In manufacturing facilities, such systems are useful for tracking parts, completed products and defects. Such systems are also utilized for cellular telephone communications to allow users with wireless telephones to roam across large geographical regions while retaining telephonic access. Paging networks also may utilize cellular communications systems which enable a user carrying a pocket sized pager to be paged anywhere within a geographic region.

A typical cellular communications system includes a number of fixed access points (also known as base stations) interconnected by a cable medium often referred to as a system backbone. Also included in many cellular communications systems are intermediate access points which are not directly connected to the system backbone but otherwise perform many of the same functions as the fixed access points. Intermediate access points, often referred to as wireless access points or base stations, increase the area within which access points connected to the system backbone can communicate with mobile devices.

Associated with each access point is a geographic cell. The cell is a geographic area in which an access point has sufficient signal strength to transmit data and receive data from a mobile device such as a data terminal or telephone with an acceptable error rate. Typically, access points will be positioned along the backbones such that the combined cell area coverage from each access point provides full coverage of a building or site.

Mobile devices such as telephones, pagers, personal digital assistants (PDA's), data terminals etc. are designed to be carried throughout the system from cell to cell. Each mobile device is capable of communicating with the system backbone via wireless communication between the mobile device and an access point to which the mobile device is registered. As the mobile device roams from one cell to another, the mobile device will typically deregister with the access point of the previous cell and register with the access point associated with the new cell. In certain situations, the mobile device will become idle and the mobile device will enter a sleep or idle mode to conserve power. The problem is that when the mobile device is awaken by a communication from another device, it can take several minutes to reestablish a connection and a communication session between the devices. Reestablishing this communication session requires utilization of several minutes of battery power each time the main processor is awaken.

Accordingly, there is an unmet need in the art for a system and method that allows a mobile communication device to quickly reestablish a communication session, while still providing a mechanism for conserving power during idle mode.

SUMMARY OF THE INVENTION

The present invention relates to a system and method that provides a mobile communication device with the ability to quickly reestablish a communication session with another device, such as an access point or the like, after the communication device is awaken from a sleep or idle mode. The mobile communication device is provided with a first power system for powering a central processing system and a second power system for powering a radio device (e.g., a PCMCIA radio card). A mobile communication device establishes a communication session with another communication device by establishing a connection via the radio device and establishing a communication session in a stack of a central processing system. During an idle period, the communication session in the stack is stored in memory. The first power system and the central processing system will then enter a low power or sleep mode, while second power system and the radio device maintain a communication connection with the other device. Upon receiving a communications directed to the mobile communication device, the first power supply and the central processing system will wake up. The central processing system will then copy the previous communication session from the memory into the stack and reestablish the communication session with the other device. This eliminates the time necessary for reestablishing a new connection by the radio device to the other device and reestablishing a new communication session by the central processing system with the other device.

In one aspect of the invention, the device has three different modes of operation which are normal mode, enhanced mode and hot mode. A central operating system resides and runs on the central processing system. In normal mode, the system is powered up and the operating system loads the radio device driver. The radio device driver loads the configuration and configures all radio device slots. A communication session between another device can then be initiated. In a suspend state, the main processor enters a sleep mode and the communication session is terminated. If the device receives a communication for the main processor, the device enters a hot mode waking up the main processor which reloads the radio driver and reloads the configuration settings. In enhanced mode, the system is powered up and the operating system loads the radio device driver. The radio device driver loads the configuration and configures all radio device slots. A communication session between another device can then be initiated. In a suspend state, the main processor loads the communication session from the stack into memory and loads the configuration settings into the memory. The main processor then enters a sleep mode, while the radio device continues keeping the communication session or link open. If the device receives a communication for the main processor, the device enters a hot mode waking up the main processor which retrieves the communication session and configuration information from the memory. The communication session then continues uninterrupted. The device mode may be user configurable between the normal mode and the enhanced mode, for example, by providing an input selection component on an input panel or the like.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system and method for saving power in a mobile communication device without modification of a stack storing the communication session. It should be understood that the description of these aspects of the invention are merely illustrative and that they should not be taken in a limiting sense.

Figure 1:
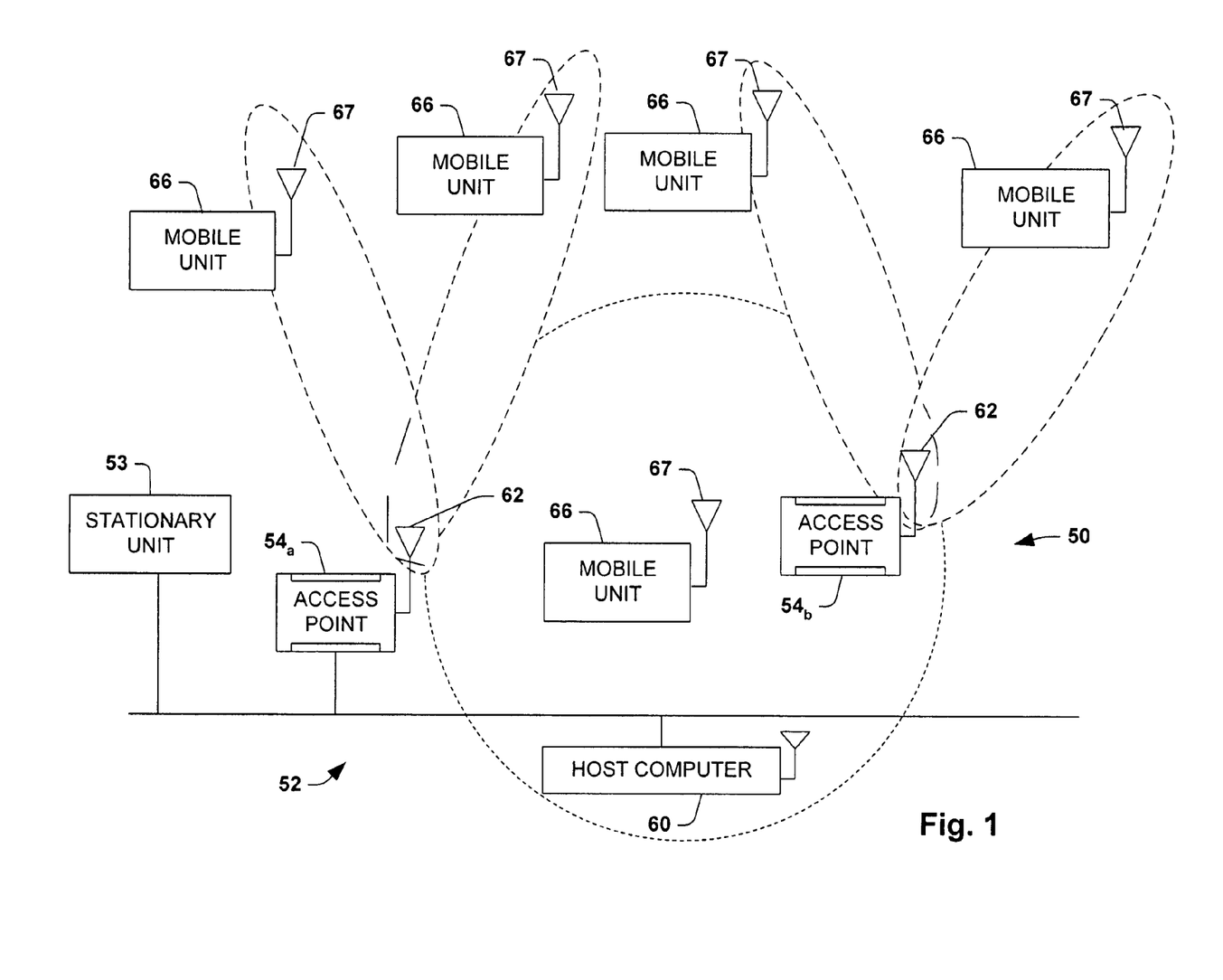
FIG. 1 is a system diagram of a network communication system in accordance with the present invention.

Referring now to FIG. 1, a cellular communication system 50 illustrating an environment of the present invention is shown. The cellular communication system 50 includes a local area network (LAN) 52. The LAN or network backbone 52 may be a hardwired data communication path made of twisted pair cable, shielded coaxial cable or fiber optic cable, for example, or may be wireless or partially wireless in nature. Coupled to the LAN 52 are a stationary communication unit 53 and several access points 54. Only one access point $54_a$ is shown hardwired to the network backbone 52, however, it is understood that more than one hardwired access points $54_a$ may be physically connected to the network backbone 52. The access points 54 may be hardwired to the network 52 such as access point $54_a$ or may be wirelessly coupled to the backbone 52 such as access point $54_b$. Each access point serves as an entrance point through which wireless communications may occur with the network backbone 52. The wireless access point $54_b$ may be employed to expand the effective communication range of the cellular communication system 50. As is conventional, each wireless access point $54_b$ associates itself, typically by registration, with another access point or a host computer coupled to the network backbone 52, whether hardwired or wireless, such that a link is formed between itself and other devices situated on the network backbone 52.

Each access point 54 is capable of wirelessly communicating with other devices in the communication system 50 via respective antennas commonly denoted by reference numeral 62. The antenna 62 for any particular device may be of any type suitable for use in a network cellular communication system, such as an omni-directional antenna, a yagi-type antenna, etc. A geographic cell (not shown) associated with each access point 54 defines a region of coverage in which successful wireless communication may occur. Depending on the type of antenna 62 selected and output power of the respective access point, the geographic cell may take one of several different forms and sizes. For example, the antenna 62 could be an omni-directional antenna if a generally spherical cell area of coverage is desired. A directed yagi-type antenna could be used as the antenna 62 for a more directed elliptical cell area of coverage.

The cellular communication system 50 also includes one or more mobile communication units 66. The mobile communication units 66 each include an antenna 67 for wirelessly communicating with other devices. Each mobile communication unit 66 communicates with devices on the network back 52 via a selected access point 54 and/or with other mobile communication units, and/or directly with the host computer 60 if within cell range of the host computer 60. Upon roaming from one cell to another, the mobile communication unit 66 is configured to associate itself with a new access point 54 or directly with the host computer 60 if within range. A mobile communicate unit 66 registers with a particular access point which provides the particular mobile communications unit with wireless access to the network backbone 52.

Figure 2:
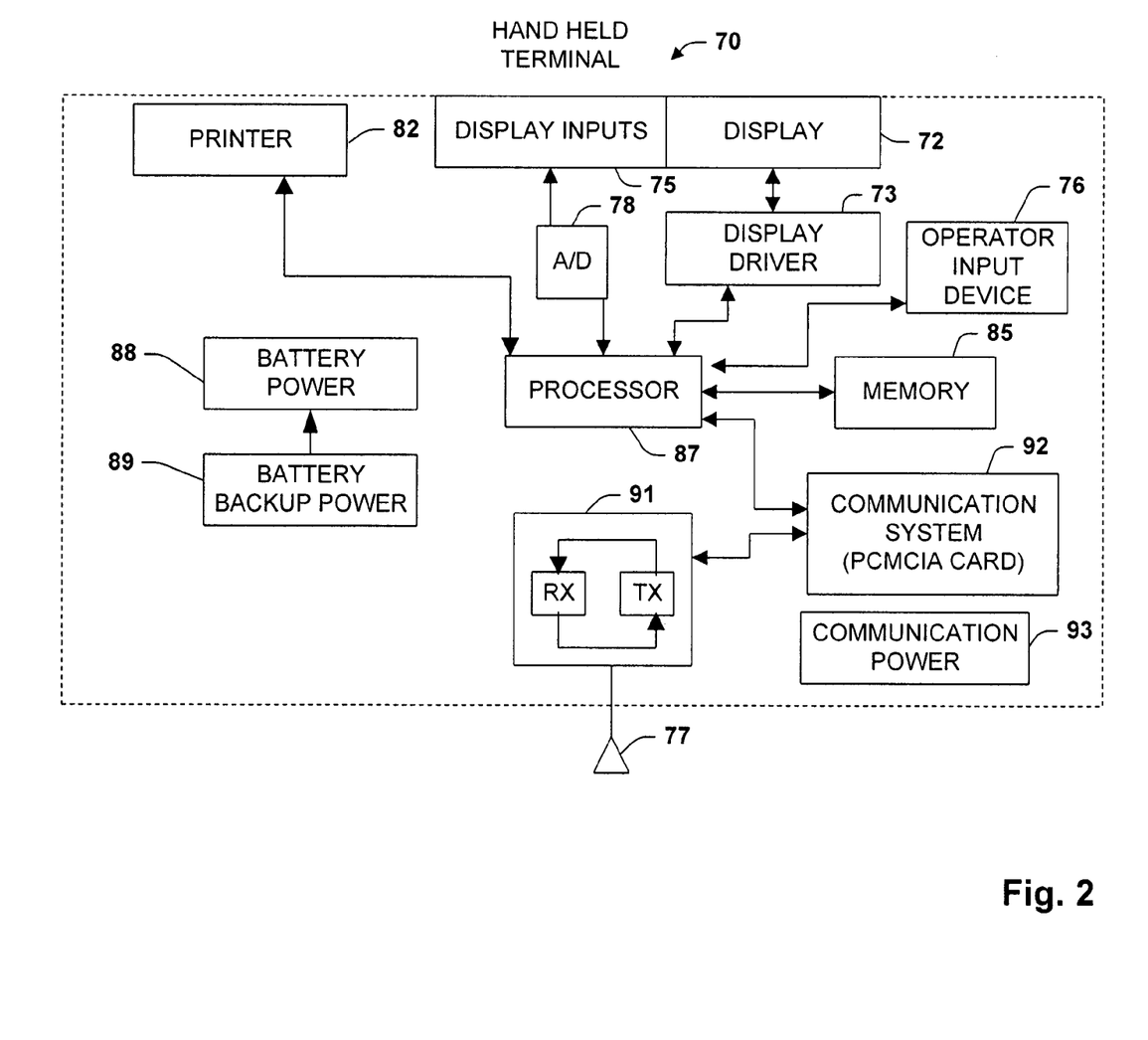
FIG. 2 is a block diagram schematic diagram of a mobile communication device in accordance with the present invention.

Referring now to FIG. 2, a schematic representation of a mobile communication device is shown according to one particular aspect of the present invention, wherein a processor 87 is responsible for controlling the general operation of a hand held portable device 70. The processor 87 is programmed to control and operate the various components within the hand held portable device 70 in order to carry out the various functions described herein. The processor or CPU 87 can be any of a plurality of processors, such as the p24T, Pentium 50/75, Pentium 60/90, and Pentium 66/100, Pentium PRO and Pentium 2, and other similar and compatible processors or micro controllers. A processor such as Intel's 8 bit microcontrollers, the 8031, 8051 or 8052 can be utilized. The manner in which the processor 87 can be programmed to carry out the functions relating to the present invention will be readily apparent to those having ordinary skill in the art based on the description provided herein.

A memory 85 tied to the processor 87 is also included in the hand held portable device 70 and serves to store program code executed by the processor 87 for carrying out operating functions of the hand held portable device 70 as described herein. The memory 85 also serves as a storage medium for temporarily storing information such as communication session data from a stack residing in one of the processor 87 or the memory 85 and/or configuration setting information. The memory 85 is adapted to store a complete set of the information to be displayed. According to a preferred aspect, the memory 85 has sufficient capacity to store multiple sets of information, and the processor 87 could include a program for alternating or cycling between various sets of display information. This feature enables a display 72 to show a variety of effects conducive for quickly conveying product and customer information to a user.

The display 72 is coupled to the processor 87 via a display driver system 73. The display 72 is preferably a touch screen display and provides display inputs 75 to the processor 87 via an A/D converter 78. The display 72 functions to display data or other information relating to ordinary operation of the hand held portable device 70. Additionally, the display 72 may display a variety of functions that control the execution of the hand held portable device 70. The display 72 is capable of displaying both alphanumeric and graphical characters.

The hand held portable device 70 further includes an operator input device 76 in the form of a key pad or the like which enables a user to enter data, information, function commands, etc. For example, the user may select between operation of the hand held portable device 70 in a normal mode or in an enhanced mode. Furthermore, a user may input information relating to product information and/or customer information via a keypad for subsequent transmission to an access point through an antenna 77. In addition, the input device 76 may include up and down cursor keys for controlling a cursor which may be shown on the display 72. The input device 76 can also include a print key for subsequent printing of information through a printer 82.

Power is provided to the processor 87 and other components forming the hand held portable device 70 by a battery power module 88. The hand held portable device 70 is protected by battery power failure by a battery backup power module 89. Typically, the battery backup module 89 is a much smaller battery than the battery module 88 and invoked only during swapping of the battery module 88 or a battery module failure. Preferably, the hand held portable device 70 will enter a minimum current draw or sleep mode upon detection of the battery power module failure. Furthermore, the processor 87 and the battery power module are operable to enter a minimum current draw or sleep mode if communications have not been directed to the hand held portable device 70 for a predetermined period of time, which may be user configurable (e.g., 30 seconds, 1 minute, 2 minutes).

The hand held portable device 70 includes a communication system 92 which coupled to the processor 87. The communication system 92 includes communication power 93 separate from the main power 88. The hand held portable device also includes an RF section 91 connected to the communication system 92 for establishing a communication connection with other devices. The RF section 91 includes an RF receiver which receives RF transmissions via the antenna 77 and demodulates the signal to obtain digital information modulated therein. The RF section 91 also includes an RF transmitter for transmitting information, for example, in response to an operator input at the operator input device 76 or the completion of a transaction.

Figure 3:
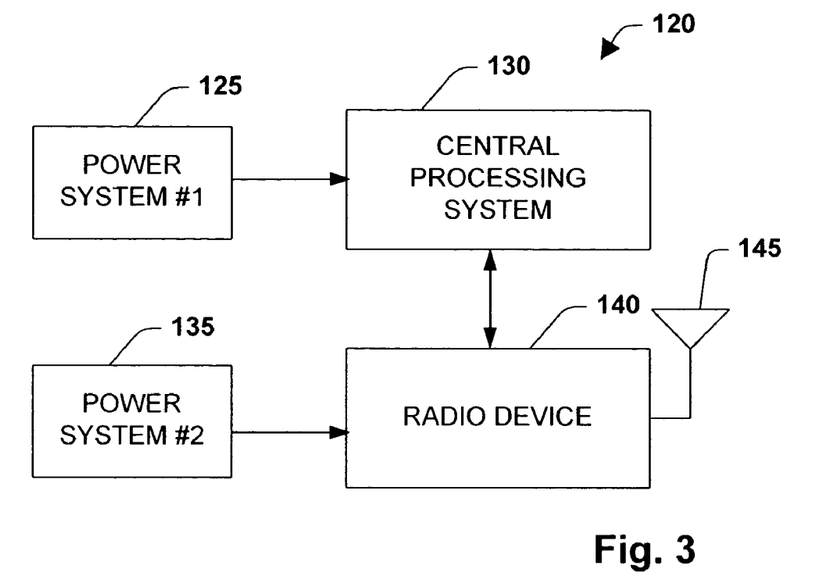
FIG. 3 is a block schematic diagram of components residing in a mobile communication device in accordance with the present invention.

Referring to FIG. 3 illustrating a schematic block diagram of a mobile communication device 120 according to the present invention. The mobile communication device 120 comprises a first power system 125 operable to provide power to a central processing system 130 and a second power system 135 operable to provide power to a radio device 140 (e.g., a PCMCIA radio card) coupled to the central processing system 130. The radio device 140 is coupled to an antenna 145 for transmitting and receiving radio communications during a communication session with an access point or the like. Providing separate power systems 125 and 135 allows for maintaining power to the radio device 140 during an idle period to maintain a communication connection or link with an access point or the like, while the central processing system 130 enters a rest state or a sleep mode. A communication from the access point or the like directed to the mobile communication device 120 causes the radio device 140 to wake up the first power supply 125 and the central operating system 130. The first power supply 125 and the central operating system 130 then use information stored about the current session to reestablish the communication session.

Figure 4:
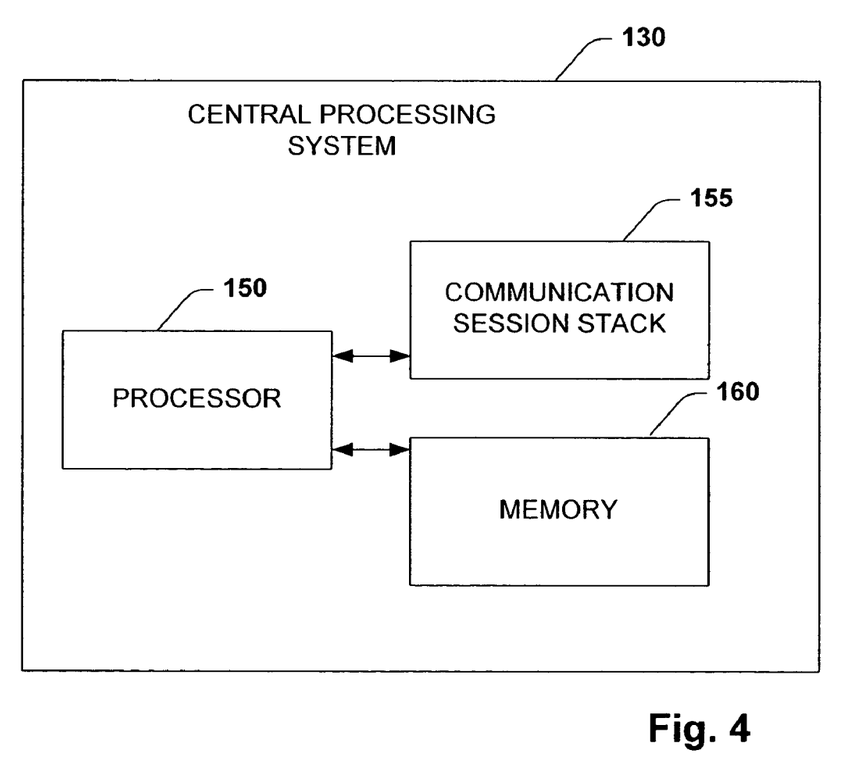
FIG. 4 is a block schematic diagram of components residing in a central processing system in accordance with the present invention.

FIG. 4 illustrates a block schematic diagram of the central processing system 130. The central processing system 130 has a processor 150 coupled to a communication session stack 155 and a memory 160. After a predetermined period of time without any communications, the processor 150 will copy the contents of the communication session stack 155 into the memory 160 and the central operating system 130 will enter a low power or sleep mode. Once communications is again commenced, the central processing system 130 will awaken and the processor 150 will copy the communication session stored in the memory 160 back into the communication session stack 155. The communication session can then continue as before without the need to reestablish a new connection by the radio device 140 and without the need to reestablish a communication session by the central processing system 130.

Figure 5:
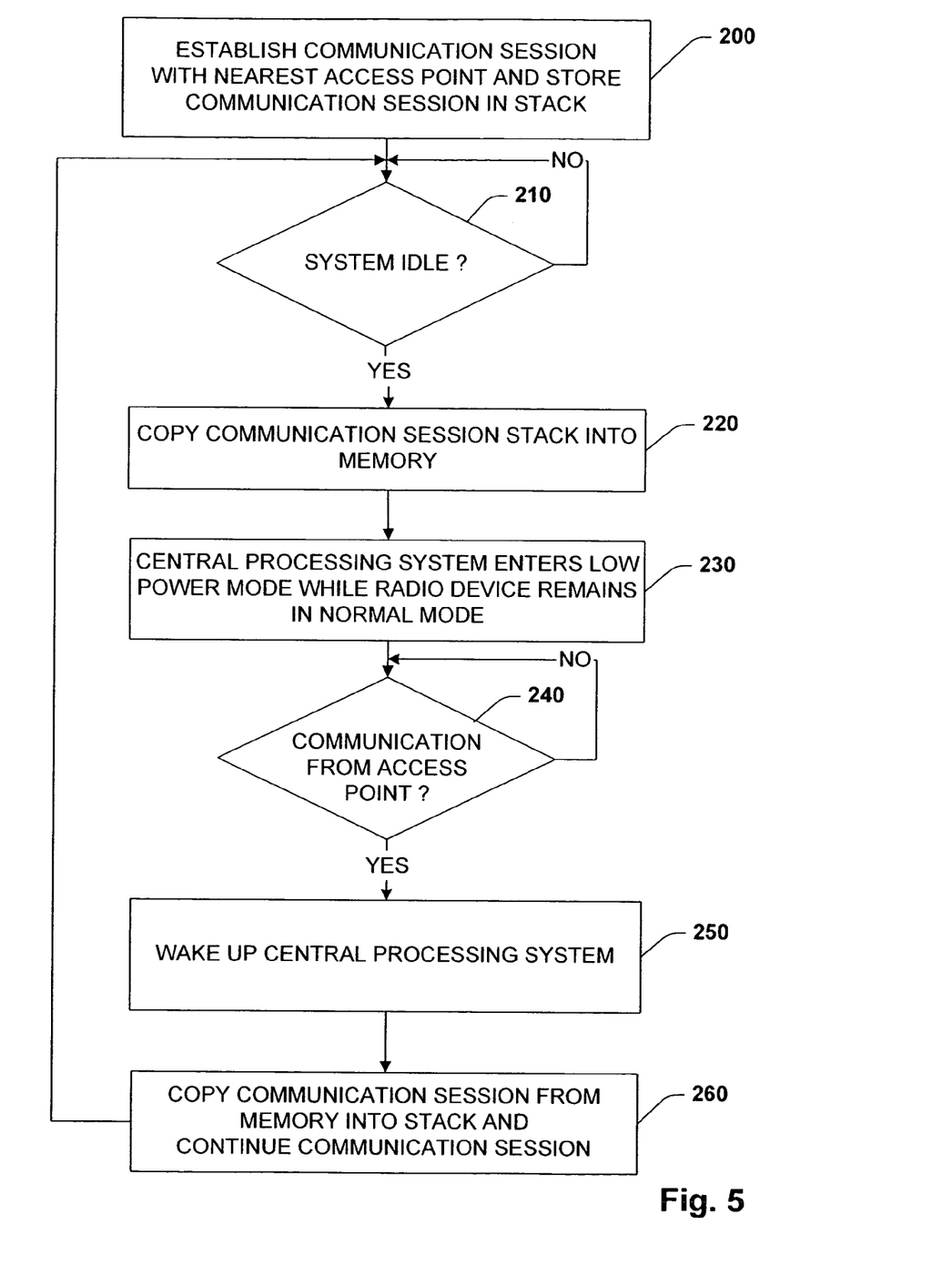
FIG. 5 is a flow diagram illustrating one particular methodology for reestablishing a communication session in accordance with the present invention.

FIG. 5 is a flow diagram illustrating one particular methodology for reestablishing a communication session after a portion of a mobile communication device enters a low power or sleep mode according to the present invention. In step 200, a mobile communication device establishes a communication connection and session with an access point or the like. In step 210, the mobile communication device determines if the system has been idle for a predefined period of time. If the system has not been idle for a predefined period of time (NO), the mobile communication device repeats step 210. If the system has been idle for a predefined period of time (YES), the mobile communication device copies the communication session stack into memory in step 220. In step 230, the central processor system enters a low power mode, while the radio device remains in normal mode and maintains the communication link. In step 240, the mobile communication device determines if there has been any communication from the access point directed to the communication device. If there has not been any communication from the access point directed to the communication device in step 240 (NO), the central processing system remains in the low power mode and the communication device repeats step 240. If there has been communication from the access point in step 240 (YES), the radio device wakes up the central processing system in step 250. The central processing system then copies the communications session from the memory back into the stack and continues the previous communication session in step 260.

Figure 6:
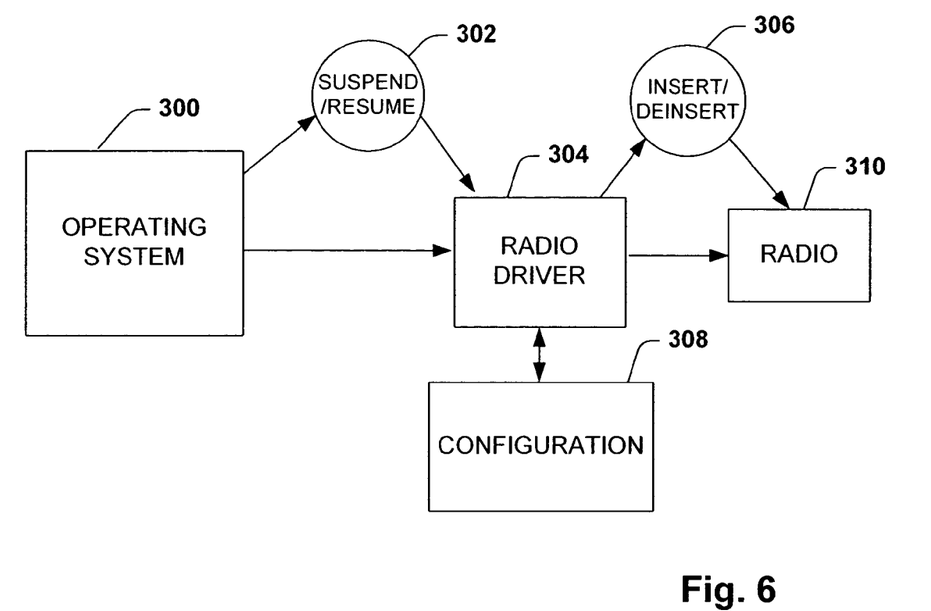
FIG. 6 is a block schematic diagram of communications between software components during normal mode in accordance with the present invention.

FIG. 6 illustrates the communications occurring between device components associated with the hand held portable device operating in normal mode. In normal mode, the system is powered up and an operating system 300 loads a radio device driver 304. The radio device driver 304 loads a configuration setting 308 and configures a radio device 310 based on the configuration setting 308. The configuration setting includes the setting of the operating mode which is normal or enhanced. The setting of the mode may be user configurable by selecting the mode from an input device residing on the hand held portable device. A communication session between another device can then be initiated. In a suspend state, the operating system 300 initiates a suspend event 302, which is received by the radio driver 304. The main processor enters a sleep mode and the communication session is terminated. If the device receives a communication for the main processor, the device enters a hot mode waking up the main processor and causing the operating system 300 to initiate a resume event 302. On resume, the radio driver 304 initiates a deinsertion event 306 followed by an insertion event 306. The series of events causes the previous communication session to be lost. The operating system 300 then reloads the radio driver 304, which reloads the configuration settings 308. A new communication session then needs to be established to continue communications between the devices.

Figure 7:
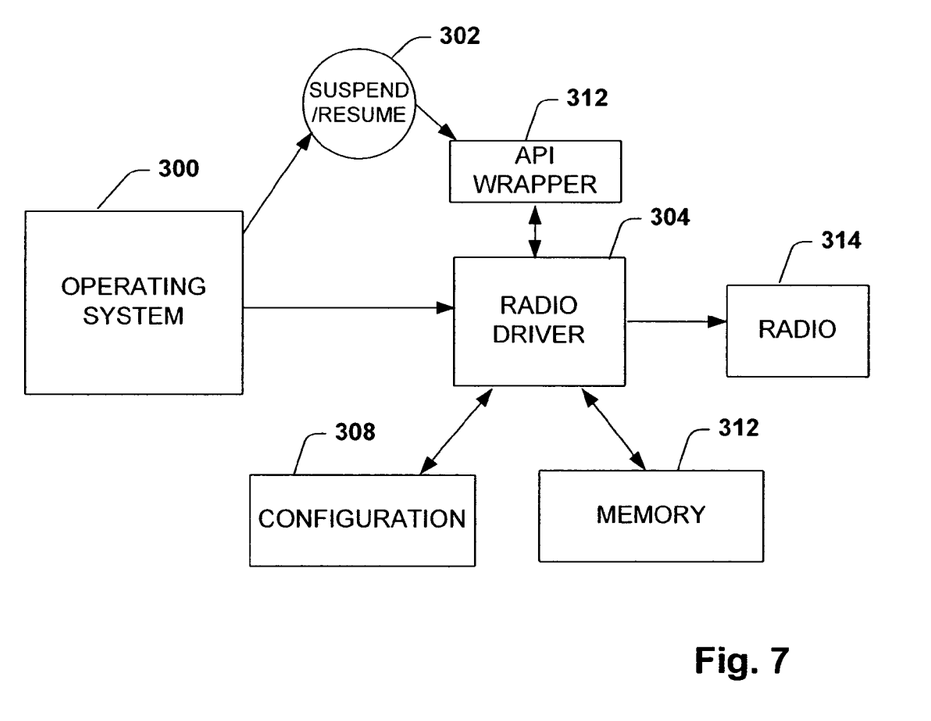
FIG. 7 is a block schematic diagram of communications between software components during enhancement mode in accordance with the present invention.

FIG. 7 illustrates the communications occurring between components associated with the device in enhanced mode. In enhanced mode, the system is powered up and the operating system 300 loads the radio device driver 304. The radio device driver 304 loads the configuration setting 308 and configures the radio device 310 based on the configuration setting 308. A communication session between another device can then be initiated. In a suspend state, the operating system 300 initiates a suspend event 302, which is caught by an application program interface (API) wrapper 312 prior to reaching the radio driver 304. The radio driver 304 loads the communication session information and the configuration settings into a memory 314. Alternatively, the API wrapper 312 may be operable to load the communication session information and the configuration settings into a memory 312. The main processor enters a sleep mode and the communication session continues through the radio device 310. If the device receives a communication for the main processor, the device enters a hot mode waking up the main processor and causing the operating system 300 to initiate a resume event 302. The resume event is caught by the API wrapper 312 which loads, or tells the radio driver 304 to load, the communications session information back into the stack and overrides the configuration settings 308 with the configuration settings stored into the memory 314. Therefore, the radio driver 304 does not initiate a deinsertion event followed by an insertion event and the previous communication session continues with out the need to reestablish a communications link.

For example, if the operating system 300 is Microsoft® Windows® CE Operating System and the radio 310 is a PCMCIA radio card plugged into a backplane of the hand held portable device, then the PCMCIA driver will operate as planned in normal mode. On Resume, the PCMCIA driver with give a deinsertion event to all cards in all PCMCIA slots. Then an insertion event is generated for each slot with a card present. The series of events causes the TCP/EP stack in Windows® CE to lose any information that tied open WinSock socket to a given Network Device Interface Specification (NDIS) driver. Therefore, these sockets cannot communicate anymore. The enhanced mode defines that the PCMCIA driver will not create the deinsertion/insertion events on a resume of the device. Therefore, the device driver will assume the responsibility to recover on resume. Changes to the PCMCIA card and socket services or Windows® CE, the Model Device Driver (MDD) and Platform Dependent Driver (PDD) are required to get the modes to work. A NDIS driver can support this mode by implementing a stream driver wrapper around the NDIS driver, so it can catch the resume events from the system. Once a resume event has been detected, the API Wrapper can call the card/socket services to define the card into the proper mode for the Network Interface Card (NIC) card supported. Once this has happened, the API wrapper can call the initialization routines in the NDIS drivers that will reinitialize the card and override the configuration with the saved configuration settings.

Figure 8:
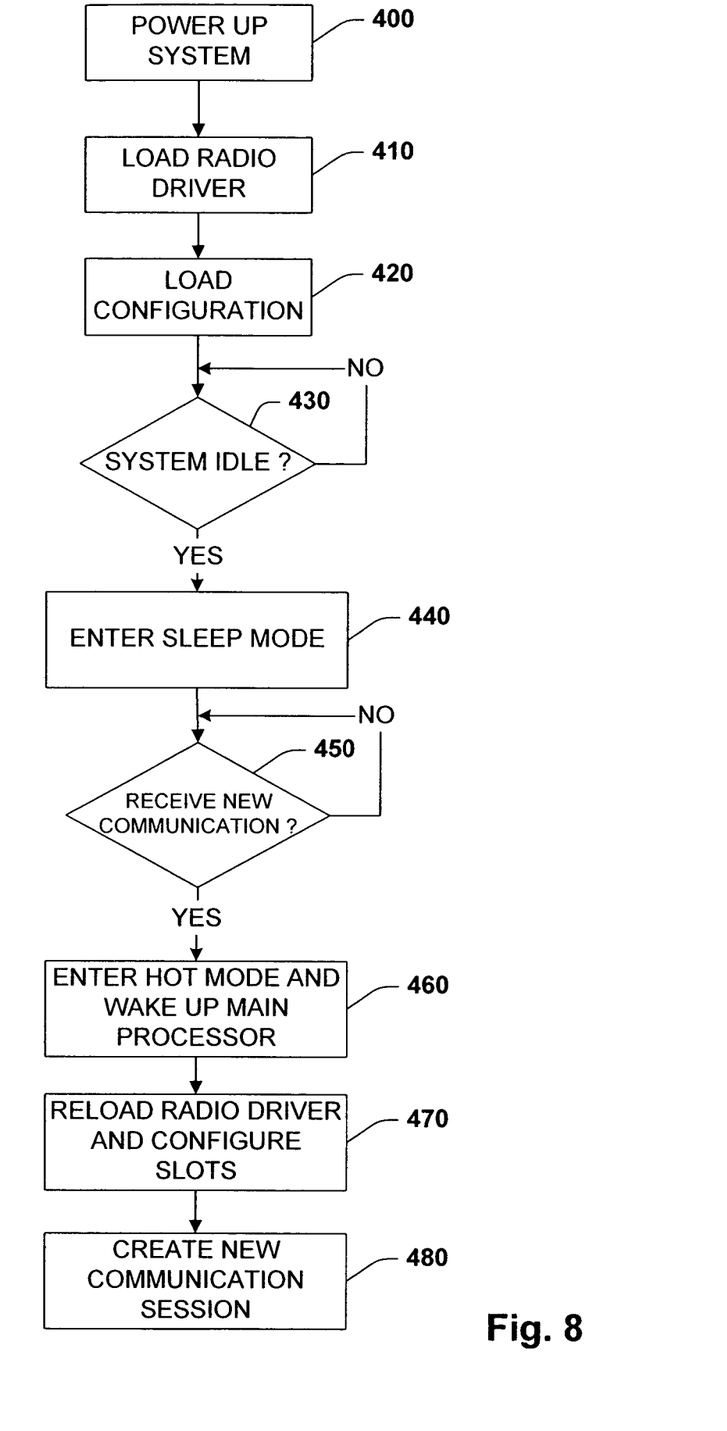
FIG. 8 is a flow diagram illustrating one particular methodology of the device operating in normal mode in accordance with the present invention.

FIG. 8 illustrates one particular methodology for the steps associated with the operation of the hand held portable device when operating in the normal mode. At step 400, the central processing system is powered up and the operating system associated with the device is loaded into memory and begins running. The radio device driver is then loaded by the operating system at step 410. At step 420, the radio device driver loads the configuration settings and configures all radio devices present in the hand held portable device. At step 430, the operating system determines if that central processing system has been idle for a predetermined period of time (e.g., has not received communications for the central processing system). If the system is not idle for a predetermined period of time (NO), the method continues repeating step 430. If the system is idle for a predetermined period of time (YES), the method advances to step 440 and the central processing system enters a sleep mode. The central processing system continues monitoring the radio device for communications directed to the central processing system. If a communication is not received for the central processing system(NO), the central processing system continues monitoring the radio device for communications directed to the central processing system. If a communication is received for the central processing system (YES), the method advances to step 460. At step 460, the system enters a hot mode and wakes up the main processor. At step 470, the operating system reloads the radio driver and the radio driver reloads the configuration settings which configures the slots of all radio devices residing in the hand held portable device. At step 480, a new communication session is initiated.

Figure 9:
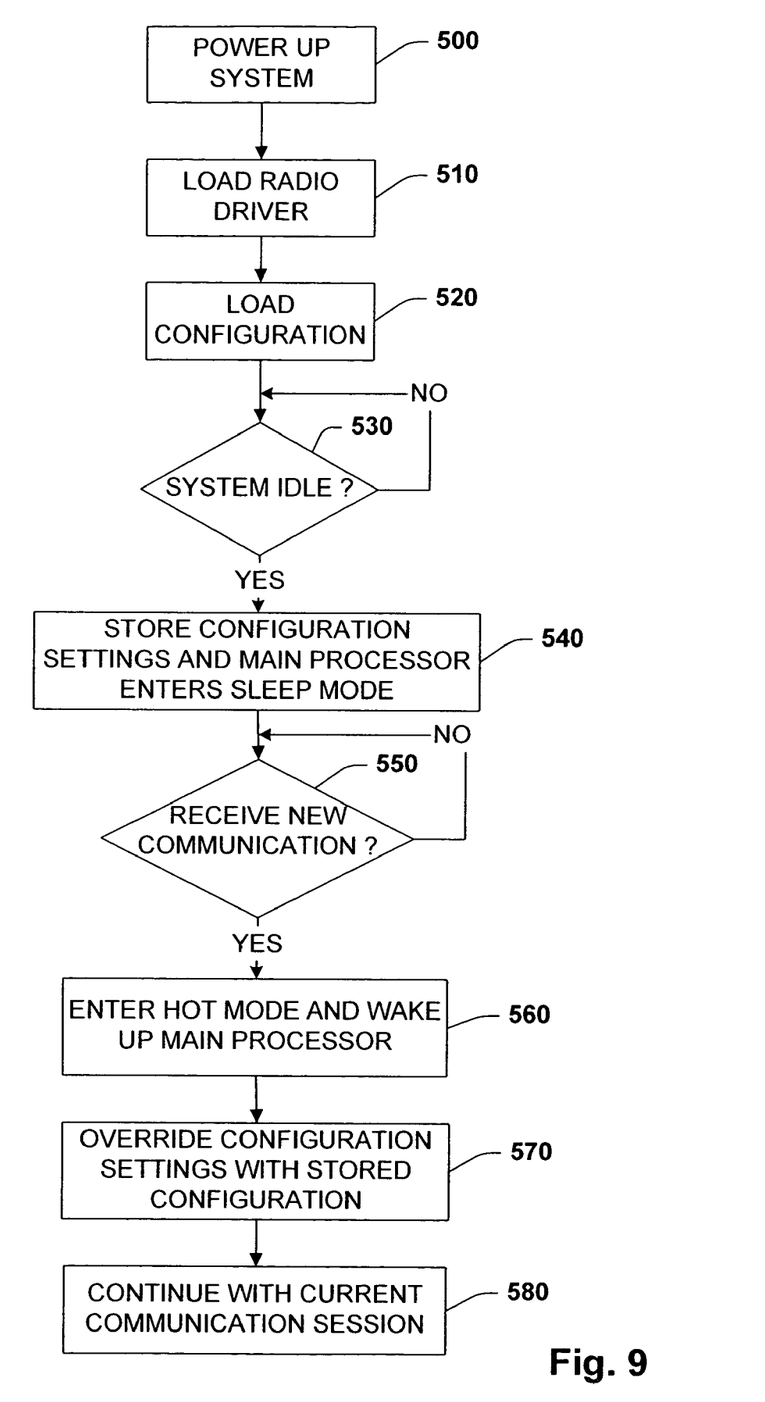
FIG. 9 is a flow diagram illustrating one particular methodology of the device operating in enhanced mode in accordance with the present invention.

FIG. 9 illustrates one particular methodology for the steps associated with the device when operating in the enhanced mode. At step 500, the central processing system is powered up and the operating system associated with the device is loaded into memory and begins running. The radio device driver is then loaded by the operating system at step 510. At step 520, the radio device driver loads the configuration settings and configures all radio devices present in the hand held portable device. At step 530, the operating system determines if that central processing system has been idle for a predetermined period of time (e.g., has not received communications for the central processing system). If the system is not idle for a predetermined period of time (NO), the method continues repeating step 530. If the system is idle for a predetermined period of time (YES), the method advances to step 540. At step 540, the configuration settings are stored and the central processing system enters a sleep mode. The central processing system continues monitoring the radio device for communications directed to the central processing system. If a communication is not received for the central processor (NO), the central processing system continues monitoring the radio device for communications directed to the central processing system. If a communication is received for the central processing system (YES), the method advances to step 560. At step 560, the system enters a hot mode and wakes up the main processor. At step 570, the operating system reloads the radio driver and the radio driver overrides the configuration settings with the stored configuration settings. At step 580, the device continues with the current communication system.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A mobile communication device, comprising:
   a first power system and a second power system; and
   a radio device that processes radio signals and receives power from the second power system, the radio device controls the first power system to operate in at least one operating state in response to a status of the radio signals;
   the first power system powers a central processing system which receives a wake-up signal from the radio device when a communication signal from a second device is directed to the mobile communication device, such that a communication session is copied from a memory to a session stack to reestablish a communication session.

2. The device of claim 1, the radio device facilitates the first power system entering a normal power state of the at least one operating state when the status of the radio signals indicates at least one of establishing a connection and establishing a session.

3. The device of claim 1, the radio device facilitates the first power system entering a low power state of the at least one operating state when the status of the radio signals indicates termination of a session.

4. The device of claim 1, a low power state of the at least one operating state is associated with a communication session of a session stack being stored in a memory.

5. The device of claim 1, a normal power state of the at least one operating state is associated with a communication session stored in a memory being placed in a session stack.

6. The device of claim 5, the communication session is a previous communication session that facilitates quick reestablishment of communication with another device.

7. The device of claim 1, the central processing system enters a low power state of the at least one operating state only after a communication session is stored in a memory.

8. The device of claim 1, the central processing system copies a configuration setting from the memory that overrides a default configuration setting.

9. The device of claim 1, the at least one operating state includes a normal mode that loads a device driver of the radio device.

10. The device of claim 9, the device driver loads configuration data in response to the device driver being loaded.

11. The device of claim 1, the at least one operating state includes an enhanced mode that maintains the radio device in a communication session while the first power system is in a sleep mode.

12. A cellular telephone according to the device of claim 1.

13. The device of claim 1, further comprising an input device that allows a user to select between at least a normal mode and an enhanced mode.

14. The device of claim 1, the radio device is at least one PCMCIA card.

15. A mobile communication device, comprising: a central processing system that receives power from a first power system; and a radio device that receives power from a second power system, the radio device processes radio signals and signals the central processing system to operate in at least one operating state in response to a status of the radio signals, wherein the at least one operating state includes a normal mode that loads a device driver of the radio device, and the device driver loads configuration data in response to the device driver being loaded.

16. The device of claim 15, the radio device facilitates the first power system entering a normal power state of the at least one operating state when the status of the radio signals indicates at least one of establishing a connection and establishing a session, and the radio device facilitates the first power system entering the low power state of the at least one operating state when the status of the radio signals indicates termination of the session.

17. The device of claim 15, a low power state of the at least one operating state is associated with a communication session of a session stack being stored in a memory, and a normal power state of the at least one operating state is associated with the communication session stored in the memory being copied therefrom and placed in the session stack.

18. The device of claim 15, the first power system powers a central processing system that operatively communicates with the radio device, the central processing system enters a low power state of the at least one operating state only after a communication session is stored in a memory and wakes up from the low power state when the radio signals are received from a second device, such that the communication session is resumed by copying the session stack from the memory into a session stack to reestablish the communication session.

19. The device of claim 15, further comprising a battery backup module that supplies power when at least one of a battery module is being replaced and the battery module fails.

20. A method of maintaining a communication session in a mobile communication device, comprising:
   receiving a first power system that supplies power to a central processing system and a second power system that supplies power to a radio device;
   creating at least a communication session in a session stack during an operating state of the central processing system when communication is established with a remote device; and
   passing the communication session between the session stack and a memory of the central processing system in accordance with the operating state.

21. The method of claim 20, the passing of the communication session further comprising, copying the communication session from the session stack to the memory of the central processing system when the operating state is a low power operating state; and copying the communication session into the session stack from the memory to reestablish the communication session when the operating state is a normal power operating state.

22. The method of claim 20, further comprising copying configuration settings into the memory prior to entering a low power operating state.

23. The method of claim 20, further comprising copying configuration settings from the memory to override default configuration settings after a wake-up signal is received by the central processing system.

24. The method of claim 20, further comprising providing an operating system running on the central processing system, which operating system initiates a suspend state prior to entering a low power operating state, and a resume event after receiving a wake-up signal.

25. The method of claim 20, the operating state is a low power state when the radio device fails to receive radio signals within a predetermined duration of time, and a normal operating state when the radio signals indicate at least one of establishing a connection and establishing a session.

26. The method of claim 20, further comprising loading a device driver of the radio device in association with a normal operating state.

27. The method of claim 20, further comprising maintaining the communication session via the radio device while the central operating system is in a low power operating state.

28. A system that facilitates a communication session in a mobile communication device, comprising:

means for receiving a first power system that supplies power to a central processing system and a second power system that supplies power to a radio device;

means for creating at least a communication session in a session stack during an operating state of the central processing system when communication is established with a remote device;

means for copying the communication session from the session stack to the memory of the central processing system when the operating state is a low power operating state; and means for copying the communication session into the session stack from the memory to reestablish the communication session when the operating state is a normal power operating state.

* * * * *

UNITED STATES PATENT AND TRADEMARK OFFICE
CERTIFICATE OF CORRECTION

| | | |
|---|---|---|
| PATENT NO. | : 7,155,262 B2 | Page 1 of 1 |
| APPLICATION NO. | : 10/629422 | |
| DATED | : December 26, 2006 | |
| INVENTOR(S) | : Richard Allen Shoobridge | |

It is certified that error appears in the above-identified patent and that said Letters Patent is hereby corrected as shown below:

Column 7, line 65: "TCP/EP" should be --TCP/IP--

Signed and Sealed this

Third Day of April, 2007

JON W. DUDAS
*Director of the United States Patent and Trademark Office*